(12) United States Patent
Asnis

(10) Patent No.: US 10,075,354 B2
(45) Date of Patent: Sep. 11, 2018

(54) IDENTIFICATION OF SERVERS BY COMMON WIDE AREA NETWORK ADDRESSES

(71) Applicant: SLING MEDIA INC., Foster City, CA (US)

(72) Inventor: Ilya Asnis, San Jose, CA (US)

(73) Assignee: SLING MEDIA L.L.C., Foster City, CA (US)

( * ) Notice: Subject to any disclaimer, the term of this patent is extended or adjusted under 35 U.S.C. 154(b) by 74 days.

(21) Appl. No.: 14/054,410

(22) Filed: Oct. 15, 2013

(65) Prior Publication Data

US 2014/0108650 A1    Apr. 17, 2014

Related U.S. Application Data

(60) Provisional application No. 61/713,264, filed on Oct. 12, 2012.

(51) Int. Cl.
| | | |
|---|---|---|
| *G06F 15/173* | (2006.01) | |
| *G06F 15/177* | (2006.01) | |
| *H04L 12/26* | (2006.01) | |
| *H04L 29/08* | (2006.01) | |

(52) U.S. Cl.
CPC ...... *H04L 43/0805* (2013.01); *H04L 67/1004* (2013.01); *H04L 67/1008* (2013.01); *H04L 67/1023* (2013.01); *H04L 67/16* (2013.01)

(58) Field of Classification Search
CPC ............. H04L 67/1008; H04L 67/1023; H04L 67/1004; H04L 67/1021
USPC ........................................................ 709/224
See application file for complete search history.

(56) References Cited

U.S. PATENT DOCUMENTS

| | | | |
|---|---|---|---|
| 6,405,239 B1 * | 6/2002 | Addington et al. | 709/203 |
| 2003/0028623 A1 * | 2/2003 | Hennessey et al. | 709/219 |
| 2003/0149755 A1 | 8/2003 | Sadot | |
| 2007/0198532 A1 * | 8/2007 | Krikorian | G06Q 30/0273 705/14.69 |

(Continued)

OTHER PUBLICATIONS

European Patent Office, International Searching Authority, International Search Report and Written Opinion for International Application No. PCT/US2013/065061, dated Jan. 30, 2014.

(Continued)

*Primary Examiner* — Davoud Aman Zand
*Assistant Examiner* — Adam A Cooney
(74) *Attorney, Agent, or Firm* — Lorenz & Kopf, LLP

(57) ABSTRACT

Systems, devices and methods are described to identify server nodes operating on a data network that are available to a client node. A registry server receives registration messages from each of the of server nodes and maintains a listing server nodes and their associated server addresses. When a request is received from a client, the registry server identifies server nodes having the same network address as the client, thereby indicating that the client and server nodes are likely to reside behind a common router or on a common local area network. A list of identified server nodes can then be forwarded to the client so that the client can establish connections as desired. These techniques may be used, for example, to establish video placeshifting connections between a placeshifting server device and a phone, tablet or other media client.

14 Claims, 2 Drawing Sheets

(56) References Cited

U.S. PATENT DOCUMENTS

Figure 1:
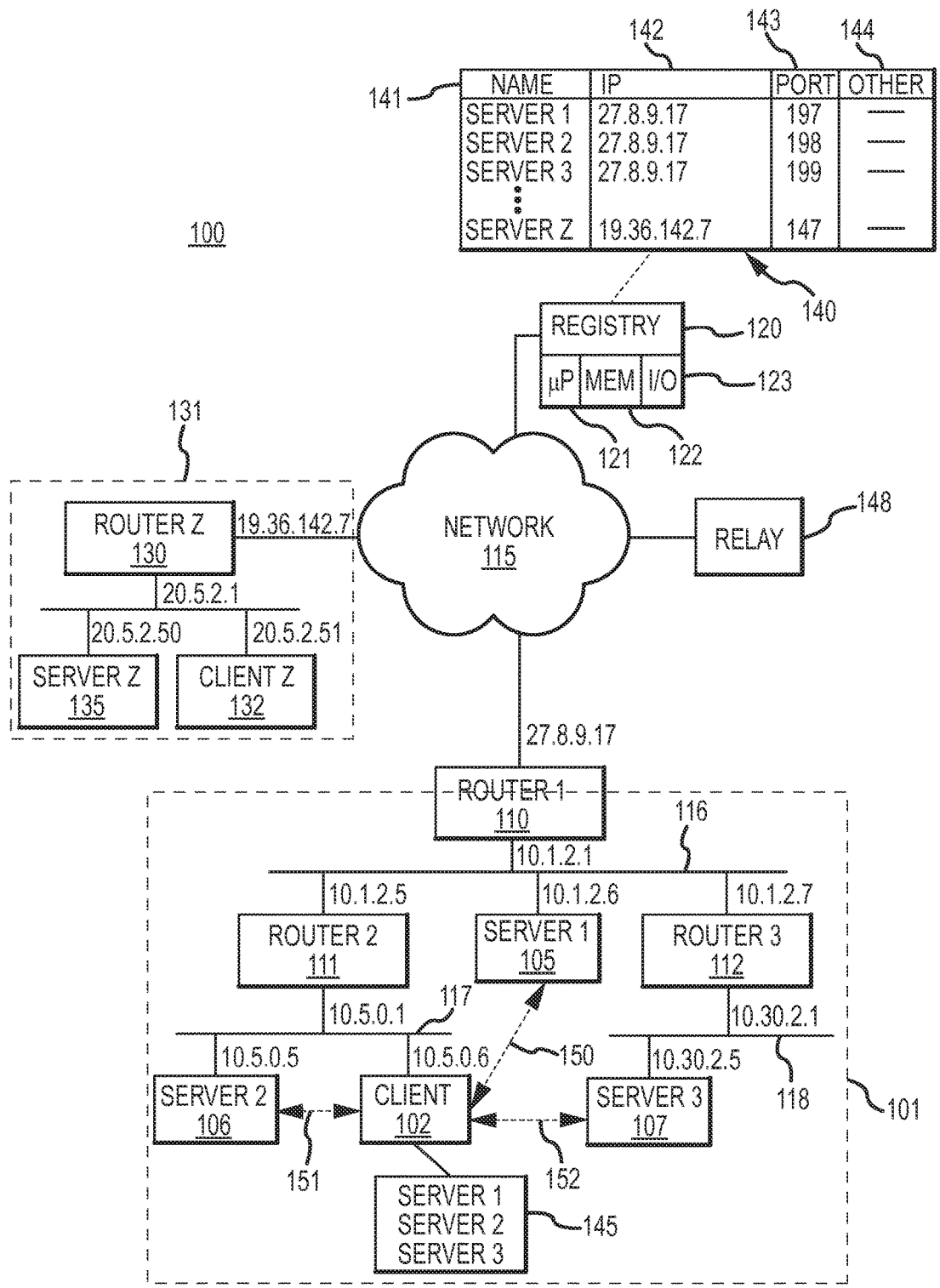

| | | | |
|---|---|---|---|
| 2008/0148379 A1* | 6/2008 | Xu | H04L 29/125 726/11 |
| 2011/0055322 A1* | 3/2011 | Gregersen | H04L 29/12103 709/203 |
| 2011/0153718 A1* | 6/2011 | Dham | H04L 12/2834 709/203 |
| 2012/0131625 A1* | 5/2012 | Satheesh | 725/109 |
| 2012/0158996 A1 | 6/2012 | Thaler, III | |

OTHER PUBLICATIONS

The International Bureau of WIPO, International Preliminary Report on Patentability in International Application No. PCT/US2013/065061 dated Apr. 23, 2015.

* cited by examiner

IDENTIFICATION OF SERVERS BY COMMON WIDE AREA NETWORK ADDRESSES

PRIORITY CLAIM

This application claims priority of U.S. Provisional Application Ser. No. 61/713,264, which was filed on Oct. 12, 2012.

TECHNICAL FIELD

The following discussion generally relates to identifying server nodes operating within a network to a client node. More particularly, the following discussion relates to systems, devices and methods to identify networked servers that are operating within the same network as the client through commonalities in wide area network addresses.

BACKGROUND

Local area and other data networks are now found in many homes, businesses and other environments. Although data networks were originally developed to allow computers to communicate with each other, modern data networks allow many other types of devices to conveniently share data with each other. In addition to computers, phones and other conventional communications devices, many modern consumer electronics devices such as televisions, television receivers/set top boxes, video game consoles, media players and the like are now network-enabled, thereby greatly improving the convenience and the availability of new services and features for consumers.

Media placeshifting is just one example of an application that makes use of networked components that are typically located within a home or office network. So-called placeshifting devices allow the consumer to change the viewing location for his or her media content. Rather than being limited to watching content on a home television, for example, placeshifting allows customer to transmit his or her own media content over a network to another location. Traditional placeshifting devices typically receive a video signal that would otherwise be provided directly to a television from a receiver, media player or other video source. Rather than providing the video signal to the local television display, however, a conventional placeshifting device converts the received video signal into a network stream that can be transmitted over the Internet or another network to the user's mobile phone, tablet, personal computer, or other client device. This greatly improves the user's viewing experience by freeing the user from his or her home television while still providing the user's own content in the placeshifted media stream.

As home and office networks become increasing complex, however, challenges in establishing communications between devices can arise. Many home networks now contain multiple wireless and/or wired networks that are interconnected by one or more bridges, routers, gateways and/or other routing devices. A typical home network, for example, now includes a cable or digital services link (DSL) modem as well as one or more wireless access points (WAPs), as well as any number of bridges, switches, hubs and/or other network components. Each of these components may have different standard or non-standard configurations based upon manufacturer defaults, user-applied configuration changes, and/or any number of other factors. Home network topologies and operations, then, can vary widely from user to user and home to home.

This variation can create substantial uncertainty in locating server nodes (such as placeshifting devices or other media sources) on a user's home network. Since it is difficult for a device manufacturer to predict how any particular home or office network will operate, it can be relatively difficult to design products such as placeshifting devices that rely upon communications between clients and servers operating within the unknown environment. This problem is not limited to placeshifting; similar issues are encountered in other types of media streaming, video gaming, file sharing and in many other applications.

It is therefore desirable to assist client nodes in identifying sources of services that may be available on a user's home or office network, even though the home or office network may be relatively complex and/or may involve multiple routing devices. This and other desirable features and characteristics will become apparent from the subsequent detailed description and the appended claims, taken in conjunction with the accompanying drawings and this background section.

BRIEF SUMMARY OF EXEMPLARY EMBODIMENTS

Various systems, devices and methods are described to identify server nodes operating on a data network that are available to a client node. In a typical implementation, a registry server receives registration messages from each of the of server nodes and maintains a listing server nodes and their associated server addresses. When a request is received from a client, the registry server identifies server nodes having the same network address as the client, thereby indicating that the client and server nodes are likely to reside behind a common router or on a common local area network. A list of identified server nodes can then be forwarded to the client so that the client can establish connections as desired. These techniques may be used, for example, to establish video placeshifting connections between a placeshifting server device and a phone, tablet or other media client. Other embodiments may be used for video gaming, file sharing, audio or video media playing, image sharing or any number of other applications.

In some example embodiments, a method is performed by a registry server or other computer system to identify available server nodes operating on a data network to a client node. The method suitably comprises receiving registration messages at the registry server from each of the plurality of server nodes via the network, wherein each of the registration messages comprises a server address associated with the server node that identifies a location of the server node on the data network; maintaining, by the registry server, a listing of the plurality of server nodes that comprises the server address of each server node; receiving a request message from the client node, wherein the request message comprises a client address associated with the client node that identifies a location of the client node on the data network; identifying, by the registry server, which of the plurality of server nodes are associated with server addresses that are the same as the client address associated with the client node; and forwarding a list of those server nodes associated with the same address as the client node to the client node via the data network.

Other embodiments provide methods performed by a registry server or other computer system to identify available communication nodes operating on a local area network. The example method suitably comprises receiving registration messages at the registry server from each of the plurality of communication nodes via a wide area network, wherein each of the registration messages comprises a wide area network address associated with the communication node that identifies a location of the communication node on the wide area network; maintaining, by the registry server, a listing of the plurality of communication nodes that comprises the wide area network address of each communication node; receiving a request message from a requesting node, wherein the request message comprises a client wide area network address associated with the requesting node that identifies a location of the client node on the wide area network; identifying, by the registry server, which of the plurality of communication nodes are associated with wide area network addresses that matches the client wide area network address associated with the requesting node; and forwarding a list of those communication nodes associated with the same address as the client wide area network address node to the requesting node via the wide area network.

Still other embodiments provide a computerized registry system to identify server nodes available to a client node from a plurality of server nodes operating on a data network. The computer system comprises an interface to a data network, a database configured to store a listing of the plurality of server nodes, and a processor. The processor is configured to receive registration messages from each of the plurality of server nodes via the data network, wherein each of the registration messages comprises a server address associated with the server node that identifies a location of the server node on the data network; in response to the registration messages, to update the listing of the plurality of server nodes with the server address of the registering server node; to receive a subsequent request message from the client node, wherein the request message comprises a client address associated with the client node that identifies a location of the client node on the data network; to query the database to thereby identify those server nodes having server addresses that are the same as the client address associated with the client node; and to forward a list of the identified server nodes associated with the same address as the client node to the client node via the data network.

Other embodiments may provide additional or alternate systems, devices and/or methods, as described more fully below.

BRIEF DESCRIPTION OF THE DRAWING FIGURES

Figure 2:
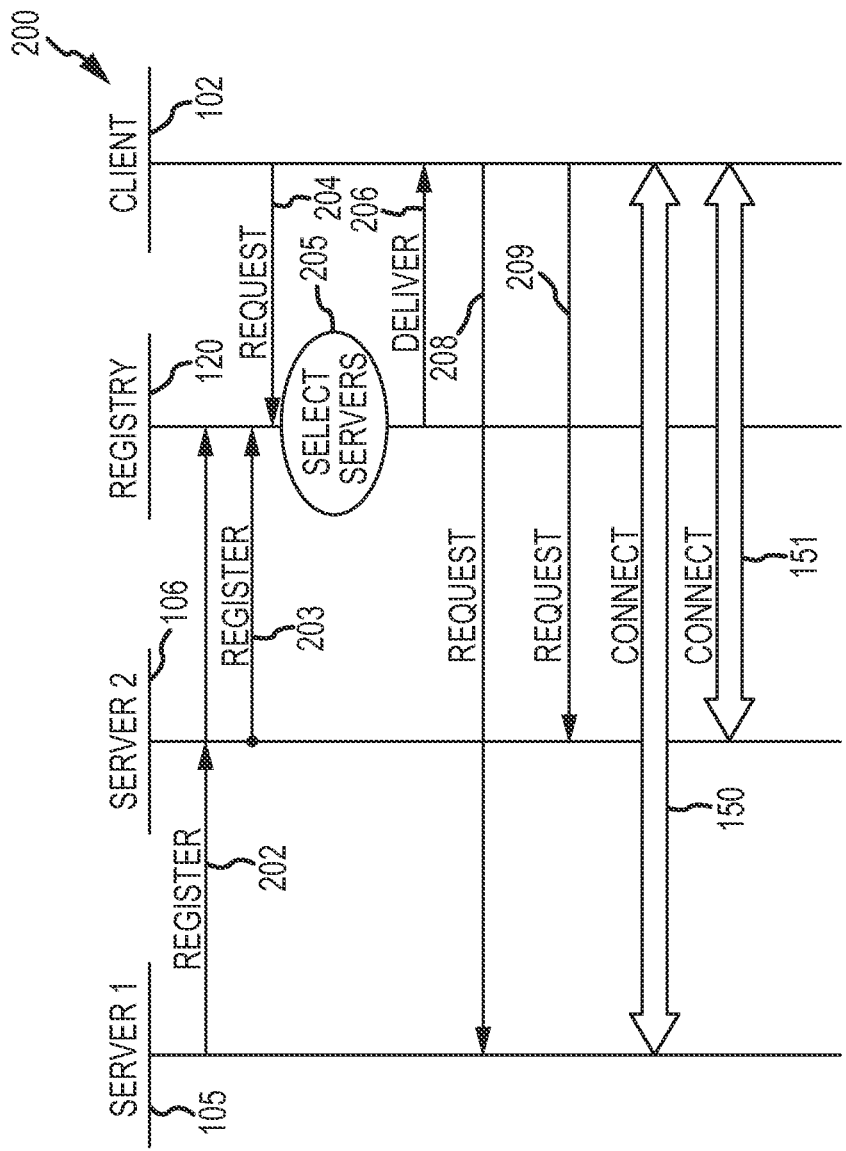

Exemplary embodiments will hereinafter be described in conjunction with the following drawing figures, wherein like numerals denote like elements, and FIG. 1 is a diagram of an exemplary system for locating servers operating within a data networking environment; and FIG. 2 is a diagram illustrating an exemplary process for identifying servers operating within a data networking environment.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, network client nodes are able to locate server nodes operating within the same home or office network environment by contacting a registry server on the Internet or another wide area network (WAN) that provides a listing of servers operating behind a common router as the requesting client node. This can be determined, for example, by comparing a wide area network address of the client to the wide area network addresses of servers that have previously registered with the registry. Clients and servers that are using the same WAN address may be presumed to be located behind a common router or gateway, thereby strongly implying that the devices are located within a common home, office or other network environment. Conventional internet protocol (IP) addresses used on the Internet or another WAN, for example, can indicate such commonalities.

Turning now to the drawing figures and with initial reference to FIG. 1, an exemplary system 100 to identify co-located servers 105-107 to a client 102 suitably provides a registry service 120 that maintains a listing 140 of server addresses 142. Each server node 105-107, 135 is configured to initially register with the registry service 120 so that the registry 120 maintains current address information 142 for each server 105-107, 135 that is active in the system 100. The registry service 120 responds to client requests by providing a sub-list 145 that identifies those servers 105-107 that are using the same internet protocol (IP) or other WAN address as the requesting client 102. Since the effective WAN addresses of client 102 and the servers 105-107 are the same, the various nodes can be assumed to be operating behind a common router 110, and therefore to be associated with a common home, office or other common network environment 101 as desired. The client 102 can then use the list 145 to attempt connections 150-152 with one or more servers 105-107 (respectively), for troubleshooting, or for any other purpose.

FIG. 1 illustrates two different home network environments 101 and 131. Each environment 101, 131 includes a cable modem, DSL modem, router, gateway or other interface to the Internet or another common wide area network 115, as appropriate.

An exemplary home, office or other user network environment 101 suitably includes one or more router-type devices that support one or more associated local area networks (LANs). In the example illustrated in FIG. 1, routers 110, in and 112 support three separate LANS 116, 117 and 118, respectively. More particularly, router 110 provides an interface between LAN 116 and the Internet or another wide area network 115. Router in provides an interface between LAN 116 and LAN 117, and router 112 provides an interface between LAN 116 and LAN 118. Each of the various LAN and WAN interfaces in FIG. 1 are labeled with an exemplary network address. While the addresses in FIG. 1 generally conform to the format of internet protocol (IP) addresses for convenience, the numbers themselves are selected somewhat arbitrarily to illustrate the principles set forth herein. The particular numbers shown in FIG. 1 are not intended to conform to the numerical requirements of IP or any other protocol. Of course many equivalent embodiments may use any number of different devices, nodes, LANs and addresses arranged in any configurations or topologies other than the example illustrated in FIG. 1.

Clients 102 and 132 are any network nodes that attempt to reach a networked service provided by one or more server nodes 105, 106, 107 and/or 135. Typically, client 102 is a computing device such as a mobile phone, tablet, computer system or consumer electronic device that includes a conventional processor, memory, input/output interfaces and the like for communicating within network environment 100. In a placeshifting scenario, for example, client 102 may be a mobile phone, tablet or computer executing a media player application that attempts to stream media content from one or more servers 105-107 and/or 135. A conventional personal computer executing a web browser application, for example, may act as a client 102 for purposes of obtaining streaming media or other content from a server 105-107, 135 as desired. Other types of client devices may equivalently support placeshifting or other applications, as desired.

Server nodes 105-107 and 135 are any devices capable of supporting network services within environment 100. Network services may be intended for access via WAN 115, or may be limited to the home environment 101, 131 as desired. Although this document emphasizes media placeshifting as a network service, the concepts described herein could be equivalently applied to any number of other services such as video gaming, media streaming, file sharing, web hosting, database access, remote login, messaging and/or the like. Each server node 105-107 and 135 typically incorporates conventional hardware and software resources, such as a processor, memory, input/output interfaces and the like.

Registry service 120 is any sort of web or other network service that accepts communications on network 115 from clients 102, 132 and servers 105-107, 135 and that maintains a database or other registry 140 of server addresses 142. Registry service 120 is shown in FIG. 1 as incorporating conventional computing hardware and software resources, such as a processor 121, memory 122 and input/output interfaces 123 for communicating on network 115 or performing other functions. Registry service 120 may be provided on its own network server hardware platform, or it may be implemented as a service that shares hardware with other services (e.g., relay server 148 or the like). Registry service 120 may be equivalently implemented using cloud computing resources, such as Amazon Web Services (AWS) or the like.

Registry 140 is any database, file or other repository of information associated with the various servers 105-107, 135 operating within environment 100. In various embodiments, registry 140 maintains a server name or other identifier 141, an effective WAN address 142 of each server, and/or any other information such as a TCP/IP port number 143, a local address (e.g., an Ethernet or other LAN address), a subnet address (e.g., an IP address used in communication behind router 110, 111 and/or 112), or any other information 144 as desired. Various embodiments may include additional and/or alternate information in the repository 140, as desired.

Before a client 102 can establish a connection 150-152 with one or more servers 105-107, the client 102 typically needs to find the service on the network 100. As noted above, this can be a substantial challenge even if the client 102 and desired server 105-107 are located within the same home environment 101. In the example of FIG. 1, for example, client 102 operates on LAN 117 with an address of 10.5.0.6. If client 102 were to send a broadcast message on LAN 117, server 106 may respond, but servers 105 and 107 may not see the broadcast unless routers 110, 111 and/or 112 are properly configured to forward such messages. Often, routing devices are set by default to block multicast broadcasts (or at least to not retransmit such broadcasts), so in practice it can be difficult to identify network services even within the same home environment 101.

Typically, however, all of the various client and server devices operating within a home environment access the wide area network 115 using a common access point, such as router no in FIG. 1. From the viewpoint of a server 140 operating on network 115, then, all of the various clients, servers and other devices operating behind router 110 will share a common network address (e.g., 27.8.9.17 in the example of FIG. 1), with different port numbers differentiating the different services.

Registry server 120 is therefore able to identify the different servers 105-107 operating within a common network environment 101 using the shared network address. By providing clients 102 with lists 145 of servers 105-107 having the same effective WAN address as the client 102, the client 102 can become aware of services operating within the same environment 101. The client can then attempt to establish connections 150-152 with the servers 105-107 as desired.

In various embodiments, server 120 provides the requesting client 102 with additional contact information about the available servers 105, 106 to aid the client 102 in establishing a subsequent direction connection to the server. Such additional contact information may include any other information contained within registry 141, such as a LAN address, a local or subnet IP address, another address used within network 101, or the like. By receiving contact information directly from the servers 106, 107 and maintaining such information in repository 141 until requested by a client 102, then, server 120 can effectively aid client 102 in locating and establishing direct connections to other servers 105, 106 even when such connections would otherwise be relatively difficult.

FIG. 2 shows an exemplary process 200 for identifying servers 105-106 operating within the same environment 101 as a requesting client node 102. FIG. 2 shows actions taken by only two servers 105, 106 for convenience; in practice, any number of servers 105-107, 135 could be incorporated to facilitate communications within environment 101 or between environments 101, 131 as desired.

Each server 105, 106 initially registers with the registry server 120 as appropriate (functions 202, 203). Servers 105, 106 may be configured through firmware or the like to contact registry 120 upon startup, at regular or irregular intervals, in response to detected changes in network conditions, and/or according to any other temporal schedule. In practice, most routers 110 are relatively liberal in allowing outgoing network connections to network 115, so it is generally much easier for servers 105, 106 (as well as clients 102) to initiate outgoing contact with registry service 120 than it would be for registry service 120 to make incoming connections to servers 105, 106.

Registry server 120 suitably maintains the listing 140 of servers 105, 106, 107, 135 and their associated addresses 141 used on network 115. Note that the addresses 141 may be obtained from the registration messages 202, 203 themselves, since these messages will typically contain a "source address" or similar field that identifies an address on network 115 where the sending node can be reached. Often, this address will also include a port number 143 or data that can be maintained in registry listing 140. In some implementations, the registering server 105, 106 may also provide any local address information that it has (e.g., its address used on the LAN, such as an Ethernet address or an IP address used on LANs 116, 117, 118 and/or the like) for storage as other information 144. This other information 144 in registry 140 may assist in establishing connections 150, 151 at a later time.

When a client node 102 wants to establish a connection 150, 151 to a network service, the client node 102 suitably contacts the registry service 120 via network 115 (function 204). Request 204 will typically contain a "source address" that will correspond to the client's address on network 115, as established by access point or router 110. Typically, the source address used by the client 102 will correspond to the source addresses previously used by servers 105-107 that reside behind the same access point 110 on network 115.

The registry service 120 therefore creates a list 145 of servers 105-107 identified in the registry 140 that have the same source WAN address as the requesting client 102 (function 205). This list 145 can be returned to the requesting client 102 via network 115 (function 206). List 145 may also include any additional information 144 about one or more servers 105-107, such as a description of the server (e.g., "Bedroom Server"), a LAN or other local address of the server (e.g., 10.30.2.5 for server 107 illustrated in FIG. 1), or any other information as desired.

The information in list 145 may be used in any manner. In various embodiments, list 145 may be simply displayed to the user or an administrator for use in troubleshooting, network analysis or any other purpose. In other embodiments, list 145 can be presented to the user for selection of a server to establish a placeshifting or other connection 150-152.

Connections 150-152 may be established in any manner. In some implementations, the client 102 simply transmits a broadcast message requesting the identified service 105-107 to respond. Alternately, the service 105-107 may be targeted for a direct connection. In the example of FIG. 2, client 102 transmits a request message 208, 209 to the desired server 105, 106 using server addresses obtained from list 145, from a local address server, or from any other source. Other embodiments may use network address translation (NAT) hole punching targeted toward the server's local address, or toward the server's WAN address 142 and port number 143 as appropriate. Some exemplary techniques for establishing placeshifting connections are described in U.S. Pat. No. 8,149,851 and in US Patent Publication No. 2011/01553718, although other techniques could be equivalently used. Still other embodiments may contact a common relay service 148 (FIG. 1) to facilitate a connection, as desired. An example of a relay service is described in US Patent Publication 2012/0215929, although other services could be equivalently used. Many other connection techniques could be implemented, including any techniques that are subsequently developed.

Generally speaking, the various functions and features of process 200 may be automatically executed by any sort of hardware, software and/or firmware logic that is stored and/or executed on any platform. Some or all of process functions may be carried out, for example, by programmed logic executing within servers 105-106, client 102 and/or registry service 120 in FIG. 1, as appropriate. In one embodiment, processor 121 associated with registry service 120 executes software logic that performs each of the various functions associated with registry service 120. Such logic may be stored in memory 122 or in any other non-transitory storage available to registry service 120 as desired. Client 102 and servers 105-107 may similarly have processors to execute software instructions that carry out the various functions shown in process 200. Such instructions may be stored in a memory or other non-transitory storage medium available to the devices as desired. The particular logic and hardware that implements any of the various functions shown in FIG. 2 may vary from context to context, implementation to implementation, and embodiment to embodiment in accordance with the various features, scenarios and structures set forth herein. The particular means used to implement each of the various functions shown in FIG. 2, then, could be any sort of hardware processing structures that are capable of executing conventional software logic in any format. Such processing hardware may include processor 121 or other components of registry 120, as well as any other processors or other components associated with client nodes 102, server nodes 105-107, 132 or other devices as appropriate.

Various embodiments are therefore able to assist the user in identifying and locating available resources by providing a listing 145 of servers 105-107 that are operating within the same home, office or other user-controlled network environment 101 as the requesting client node 102. This can greatly assist the user in configuring his or her own network environment, and in using advanced network applications such as placeshifting, video gaming and the like.

The general systems, structures and techniques described above may be inter-combined, enhanced, modified and/or otherwise implemented to provide any number of different features. To that end, the term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method performed by a registry server to identify server nodes available to a client node, the method comprising:

receiving registration messages at the registry server from each of the plurality of server nodes via a wide area network, wherein each of the registration messages comprises a server WAN address associated with the server node that identifies a first router on the wide area network, wherein the server WAN address is supplied by the first router, and wherein each of the registration messages are formatted by the server nodes to report a local server address used by the server node for communications on a first local area network, wherein the server WAN address and the local server address are different from each other;

maintaining, by the registry server, a listing of the plurality of server nodes, wherein the listing comprises the server WAN address and the local server address of each server node, and wherein each of the server nodes are placeshifting servers configured to provide placeshifted video streams;

receiving a request message from the client node via the wide area network by the registry server, wherein the request message comprises a client WAN address associated with the router that identifies a location of the client node on the wide area network, and wherein the client node is a placeshifting client configured to receive the placeshifted video streams from the placeshifting servers;

identifying, by the registry server, which of the plurality of server nodes reside behind the same router as the client node; and forwarding a list of those server nodes residing behind the same router from the registry server to the client node via the wide area network along with the local server addresses of those server nodes to thereby allow the client node to directly initiate contact with the server nodes on the list using the local server addresses, wherein at least one of the server nodes on the list resides on a different local area network from a first local area network on which the client node resides, wherein the different local area network resides behind the same router as a first local area network but is separated from the first local area network by a second router, and wherein the different local area network uses a separate address space from the first local area network so that the local server address of the server node is not compatible with the first local area network, but wherein the client node establishes a connection to the server node on the different local area network by performing network address translation (NAT) hole punching targeted toward the second router using the local server address rather than the server WAN address on the data network.

2. The method of claim 1 wherein the server WAN addresses and the client WAN address are internet protocol (IP) addresses used to communicate on the wide area network.

3. The method of claim 2 wherein the server WAN addresses that are the same as the client WAN address identify server nodes that reside behind the same router as the client node.

4. The method of claim 1 wherein the placeshifting client is configured to receive the list of server nodes associated with the same WAN address and to contact at least one of the listed server nodes to obtain the placeshifted video streams.

5. The method of claim 4 wherein the list comprises the local addresses of each placeshifting server on the list to thereby allow the placeshifting client to contact the at least one of the listed server nodes at its local address to obtain the placeshifted video streams.

6. A method performed by a registry server to identify available communication nodes operating on a local area network, the method comprising:

receiving registration messages at the registry server from each of the plurality of communication nodes via a wide area network, wherein each of the registration messages comprises a wide area network address associated with the communication node that identifies a location of the communication node on the wide area network and a local area network address associated with the communication node that identifies a location of the communication node on a local area network;

maintaining, by the registry server, a listing of the plurality of communication nodes that comprises the wide area network address and the local area network address of each communication node, wherein the communications nodes are placeshifting servers configured to provide placeshifted video streams;

receiving a request message from a requesting node that is a video placeshifting client configured to receive the placeshifted video streams, wherein the request message comprises a client wide area network address associated with the requesting node that identifies a location of the requesting node on the wide area network;

identifying, by the registry server, which of the plurality of communication nodes are associated with wide area network addresses that matches the client wide area network address associated with the requesting node; and forwarding a list of those communication nodes associated with the same address as the client wide area network address node from the registry server to the requesting node via the wide area network along with the local area network addresses of each communication node in the list to thereby allow the requesting node to initiate direct contact the communication nodes in the list via the local area network using the local area network addresses of the communication nodes received from the registry server rather than via the wide area network and to allow the requesting node to directly establish a connection to at least one of the communication nodes by performing network address translation (NAT) hole punching targeted toward the local area network address of the communication node received from the registry server.

7. The method of claim 6 wherein the wide area network addresses are internet protocol (IP) addresses.

8. The method of claim 7 wherein at least some of the wide area network addresses are associated with a router operating on the data network, and wherein the identifying comprises selecting communication nodes having the same IP addresses as the client wide area network address.

9. The method of claim 8 wherein the selected communication nodes are servers residing behind the same router as the requesting node.

10. A computer system to identify server nodes available to a client node that is a video placeshifting client from a plurality of server nodes operating on a data network, the computer system comprising:

an interface to a data network;

a database configured to store a repository of the plurality of server nodes, wherein each of the server nodes are placeshifting servers configured to provide placeshifted video streams to the video placeshifting client; and a processor configured to:
receive registration messages from each of the plurality of server nodes via the data network, wherein each of the registration messages comprises a server address associated with the server node that identifies a location of the server node on the data network and a local address that identifies a location of the server node on a local area network, wherein the local address and the server address are different from each other;

in response to the registration messages, to update the repository of the plurality of server nodes with the server address and the local address of the registering server node;

receive a subsequent request message from the client node, wherein the request message comprises a client address associated with the client node that identifies a location of the client node on the data network;

query the database to thereby identify those server nodes having server addresses that are the same as the client address associated with the client node; and forward a list of the identified server nodes associated with the same address as the client node from the computer system to the client node via the data network along with the local addresses of those server nodes associated with the same address on the data network as the client node to thereby allow the client node to initiate direct contact the server nodes on the list over the local area network using the local addresses of the server nodes received from the computer system and to directly establish a connection from the client node to at least one of the server nodes by performing network address translation (NAT) hole punching targeted toward the local address of the server node that was received from the registry server.

11. The system of claim 10 wherein the data network is a wide area network, and wherein the server addresses and the client address are internet protocol (IP) addresses used to communicate on the wide area network.

12. The system of claim 11 wherein the client address is associated with a router operating on the wide area network, and wherein the server addresses that are the same as the client address identify server nodes that reside behind the same router as the client node.

13. The system of claim 12 wherein the client node and the identified server nodes share a common IP address that is associated with the common router.

14. The system of claim 10 wherein the list comprises the local addresses of each placeshifting server on the list to thereby allow the placeshifting client to contact the at least one of the listed server nodes at its local address to obtain the placeshifted video streams via the local area network.

* * * * *